United States Patent
Pigott et al.

(10) Patent No.: US 9,559,592 B2
(45) Date of Patent: Jan. 31, 2017

(54) SYNCHRONOUS RECTIFIER TIMER FOR DISCONTINUOUS MODE DC/DC CONVERTER

(75) Inventors: John M. Pigott, Phoenix, AZ (US); Byron G. Bynum, Gilbert, AZ (US); Geoffrey W. Perkins, Chandler, AZ (US)

(73) Assignee: NXP USA, INC., Austin, TX (US)

(*) Notice: Subject to any disclaimer, the term of this patent is extended or adjusted under 35 U.S.C. 154(b) by 962 days.

(21) Appl. No.: 13/525,882

(22) Filed: Jun. 18, 2012

(65) Prior Publication Data

US 2013/0335054 A1 Dec. 19, 2013

(51) Int. Cl.
*H02M 3/158* (2006.01)
*H02M 3/156* (2006.01)
*H02M 1/00* (2006.01)

(52) U.S. Cl.
CPC ........... *H02M 3/1588* (2013.01); *H02M 3/156* (2013.01); *H02M 3/1563* (2013.01); *H02M 2001/0009* (2013.01); *Y02B 70/1466* (2013.01)

(58) Field of Classification Search
CPC .... H02M 3/156; H02M 3/158; H02M 3/1588; H02M 3/1563
USPC .......................... 323/282, 283, 284, 285, 288
See application file for complete search history.

(56) References Cited

U.S. PATENT DOCUMENTS

| | | | |
|---|---|---|---|
| 6,441,598 B1 | 8/2002 | Ivanov | |
| 6,825,641 B2 | 11/2004 | Pigott | |
| 7,166,993 B2 | 1/2007 | Shimizu et al. | |
| 7,663,356 B2 | 2/2010 | Inatomi | |
| 7,675,281 B1* | 3/2010 | Holt | H02M 3/1588 323/282 |
| 7,800,350 B2 | 9/2010 | Pigott | |
| 2003/0017421 A1* | 1/2003 | Park | G02B 5/1857 430/321 |
| 2008/0088289 A1* | 4/2008 | Fogg | H02M 3/156 323/283 |
| 2010/0046250 A1 | 2/2010 | Noda | |
| 2010/0156366 A1 | 6/2010 | Sakai et al. | |
| 2012/0025797 A1 | 2/2012 | Futamura et al. | |
| 2013/0021008 A1* | 1/2013 | Hume | H02M 3/1588 323/271 |

OTHER PUBLICATIONS

"Approximate." Merriam-Webster.com. Merriam-Webster, n.d. Web. Apr. 21, 2016.*

(Continued)

*Primary Examiner* — Jue Zhang
*Assistant Examiner* — Lakaisha Jackson

(57) ABSTRACT

A DC-DC converter (100) includes a switching transistor (M0) connecting an input power terminal (VIN) to an inductor (114) that is also connected to an output power terminal (VOUT), a synchronous rectification transistor (M1) connected to a junction node (113) between the inductor (114) and the switching transistor (M0), and a synchronous rectifier control circuit (200) with an integration capacitor (226) having a voltage that is charged and discharged by first and second current sources (210, 220) to track the charging and discharging of the inductor current, thereby generating a synchronous rectifier control signal (SR) that is applied to the synchronous rectification transistor to discharge the inductor current to zero.

19 Claims, 4 Drawing Sheets

(56) References Cited

OTHER PUBLICATIONS

S. Bandyopadhyay et al., 20 uA to 100 mA DC-DC Converter With 2.8-4.2 V Battery Supply for Portable Applications in 45 nm CMOS, IEEE Journal of Solid-State Circuits, vol. 46, No. 12, Dec. 2011.
E.J. Carlson et al, A 20 mV Input Boost Converter With Efficient Digital Control for Thermoelectric Energy Harvesting, EEE Journal of Solid-State Circuits, vol. 45, No. 4, Apr. 2010.

\* cited by examiner

SYNCHRONOUS RECTIFIER TIMER FOR DISCONTINUOUS MODE DC/DC CONVERTER

BACKGROUND OF THE INVENTION

Field of the Invention

The present invention is directed in general to voltage converter and methods for operating same. In one aspect, the present invention relates to the manufacture and use of synchronous rectifier voltage converter circuits.

Description of the Related Art

DC/DC power converter circuits or devices are important in many portable battery-operated electronic devices, such as cellular phones and laptop computers, which are supplied with power from batteries. Typically, a DC/DC circuit converts DC power from one voltage to another voltage by accepting a DC input voltage and producing therefrom a DC output voltage which may have a different voltage level than the DC input voltage. For instance, a DC-to-DC converter may use a charging inductor and load capacitor to convert a relatively high input battery voltage to a lower or negative DC output voltage. In cases where the amount of energy required by the output load is small enough to be transferred in a time that is shorter than the whole commutation period, discontinuous mode DC-DC converters are provided where the current through the charging inductor falls to zero and remains at zero during part of the period so that the inductor is completely discharged at the end of the commutation cycle. Because of accuracy limitations in controlling the discharge of the inductor, discontinuous mode DC-DC converters are susceptible to reverse current events if the inductor discharging is stopped too late, causing reverse electrical current to flow to a ground terminal from an output terminal connecting to a load circuit through the inductor. When a reverse current occurs, power conversion efficiency of the DC-DC converter in particular is impaired. And while solutions have been proposed for improving switching control of discontinuous mode DC/DC converters, they typically require large circuits which consume excessive power.

Accordingly, a need exists for improved DC/DC converter devices and associated methods of operation to overcome the problems in the art, such as outlined above. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

Figure 1:
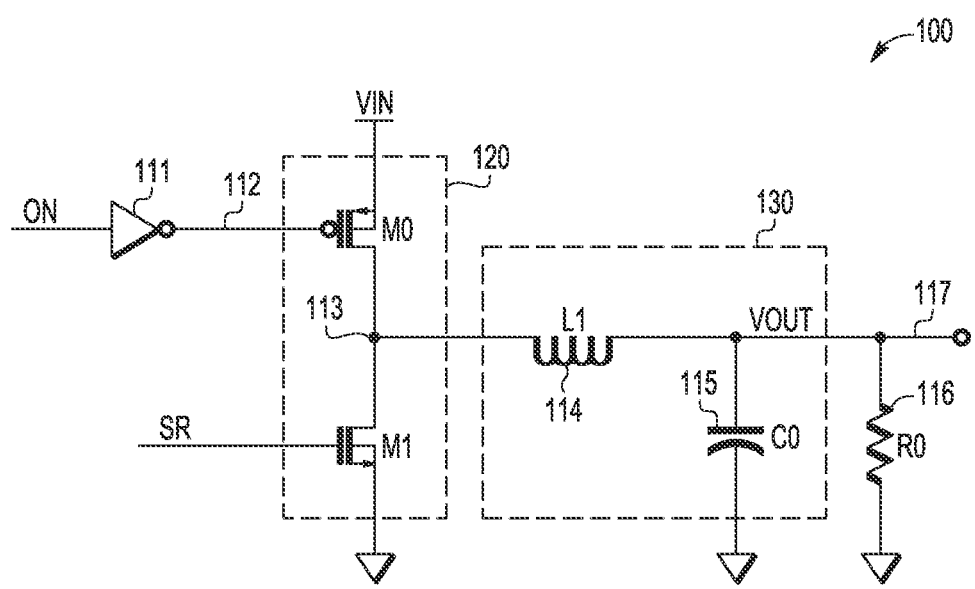
FIG. 1 is a simplified circuit schematic of a discontinuous mode DC/DC converter.

A synchronous rectifier control timer for a discontinuous mode DC/DC converter and associated method of operation are described for accurately and efficiently controlling the synchronous rectifier transistor by measuring the on-time of the charging inductor in the DC/DC converter, and generating therefrom a suitable off-time signal for turning "OFF" the synchronous rectifier of the DC/DC converter. In selected embodiments, the synchronous rectifier control timer is implemented as an integrator which uses a capacitor that is charged at a rate that is proportional to the voltage difference $\Delta V = VIN - VOUT$ and that is discharged at a rate that is proportional to the output voltage VOUT. By initializing the integrator capacitor to a start value, the integrator is configured to measure the on-time of the inductor and charge the capacitor to a voltage above the starting value by an amount proportional to the inductor current, and then effectively calculate a suitable off-time signal instant for turning "OFF" the synchronous rectifier of the DC/DC converter, thereby preventing reverse current without requiring large and inefficient current measurement circuitry. In selected example embodiments, the DC-DC converter includes an inductor connected between a junction node and a power output terminal, a first switching transistor connected a power input terminal and the junction node for charging the inductor in response to a first control signal, and a synchronous rectifier transistor connected between the junction node and a ground reference voltage for discharging the inductor in response to a second control signal. The first control signal turns "ON" the first switching transistor during an initial on-time portion of the switching cycle, causing current to flow from the source of the unregulated voltage VIN through first switching transistor and inductor to supply current to maintain the desired value of output voltage VOUT across an output load capacitor between the power output terminal and ground and/or across any external load. During the on-time portion of the switching cycle, the voltage at the junction node is high (e.g., VIN), causing the inductor current to increase at a rate that is proportional to VIN–VOUT. During an off-time portion of the switching cycle, the first control signal turns "OFF" the first switching transistor and the second control signal turns "ON" the synchronous rectifier transistor, causing a decreasing current to flow from ground to the inductor to the load, where the current decrease at a rate that is proportional to VOUT. The duration of the second control signal $T_{OFF}$ is controlled by an integrator circuit that effectively measures the duration of the on-time portion of the switching cycle of the inductor and generates therefrom a suitable off-time signal. By initializing the integrator capacitor to an initial voltage value and then charging it at a rate proportional to VIN–VOUT and then discharging it at a rate proportional to VOUT, the voltage at the integrator reaches the initial voltage value at the same time the inductor current reaches zero. In this way, a comparator may be used to detect when the integrator voltage returns to the initial voltage value, thereby turning "OFF" the second control signal.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in simplified schematic diagram form, rather than in detail, in order to avoid limiting or obscuring the present invention. In addition, some portions of the detailed descriptions provided herein are presented in terms of algorithms or operations on data, within a computer memory. Such descriptions and representations are used by those skilled in the art to describe and convey the substance of their work to others skilled in the art. Various illustrative embodiments of the present invention will now be described in detail below with reference to the figures.

FIG. 1 shows a simplified circuit schematic of a DC/DC converter 100 for converting an input voltage VIN to an output voltage VOUT. The depicted DC/DC converter 100 includes an output power switch stage 120 and an external LC filter 130. As depicted, output power switch stage 120 includes a first PMOS switching transistor M0 connected in series with a second NMOS synchronous rectifier transistor M1 between a power input terminal (e.g., VIN) and a first reference voltage (e.g., ground), thereby defining an internal junction node 113. The first and second transistors M0, M1 are respectively controlled by a first control signal ON and a second control signal SR, where the first control signal ON is shown as being inverted by inverter 111 before being applied to the gate terminal 112 of the first transistor M0, and where the second control signal SR is shown as being applied directly to the gate terminal of the second transistor M1. However, it will be appreciated that other types and arrangements of transistors and control signals can be used as desired to implement the functionality of the output power switch stage 120. The depicted external LC filter 130 includes an inductor L1 connected between the junction node 113 and a power output terminal 117. In addition, a filter capacitor C0 115 and load resistor R0 116 are coupled in parallel between the power output terminal 117 and ground.

To operate the DC/DC converter 100 in a discontinuous mode, the first and second control signals, ON and SR, are applied sequentially to the output power switch stage 120 so that the first switching transistor M0 is turned "ON" to charge the L1 inductor 114 in response to the first control signal ON, and so that the second synchronous rectifier transistor M1 is turned "ON" to discharge the L1 inductor 114 in response to the second control signal SR. In particular, the first control signal ON turns "ON" the first switching transistor M0 during an initial on-time portion of the switching cycle, causing current to flow from the power input terminal VIN through first switching transistor M0 and inductor L1 114 to supply current to maintain the desired value of output voltage VOLT across an output load capacitor 115 between the power output terminal 117 and/or across any additional external load 116. During the on-time portion of the switching cycle, the voltage at the junction node 113 is high (e.g., VIN), causing the inductor current to increase at a rate that is proportional to VIN−VOUT. In addition, the flow of the inductor current into the C0 load capacitor 115 maintains the value of VOUT at approximately the desired regulated value. During an off-time portion of the switching cycle, the first control signal ON turns "OFF" the first switching transistor M0, and the second control signal SR turns "ON" the synchronous rectifier transistor M1, causing the inductor current to flow from ground through the inductor 114 to the output 117, decaying at a rate that is proportional to VOUT. In order to avoid reverse current, the synchronous rectifier transistor M1 must be turned "ON" for only the time interval between the first switching transistor M0 being turned "OFF" and the L1 inductor 114 current returning to zero.

Figure 2:
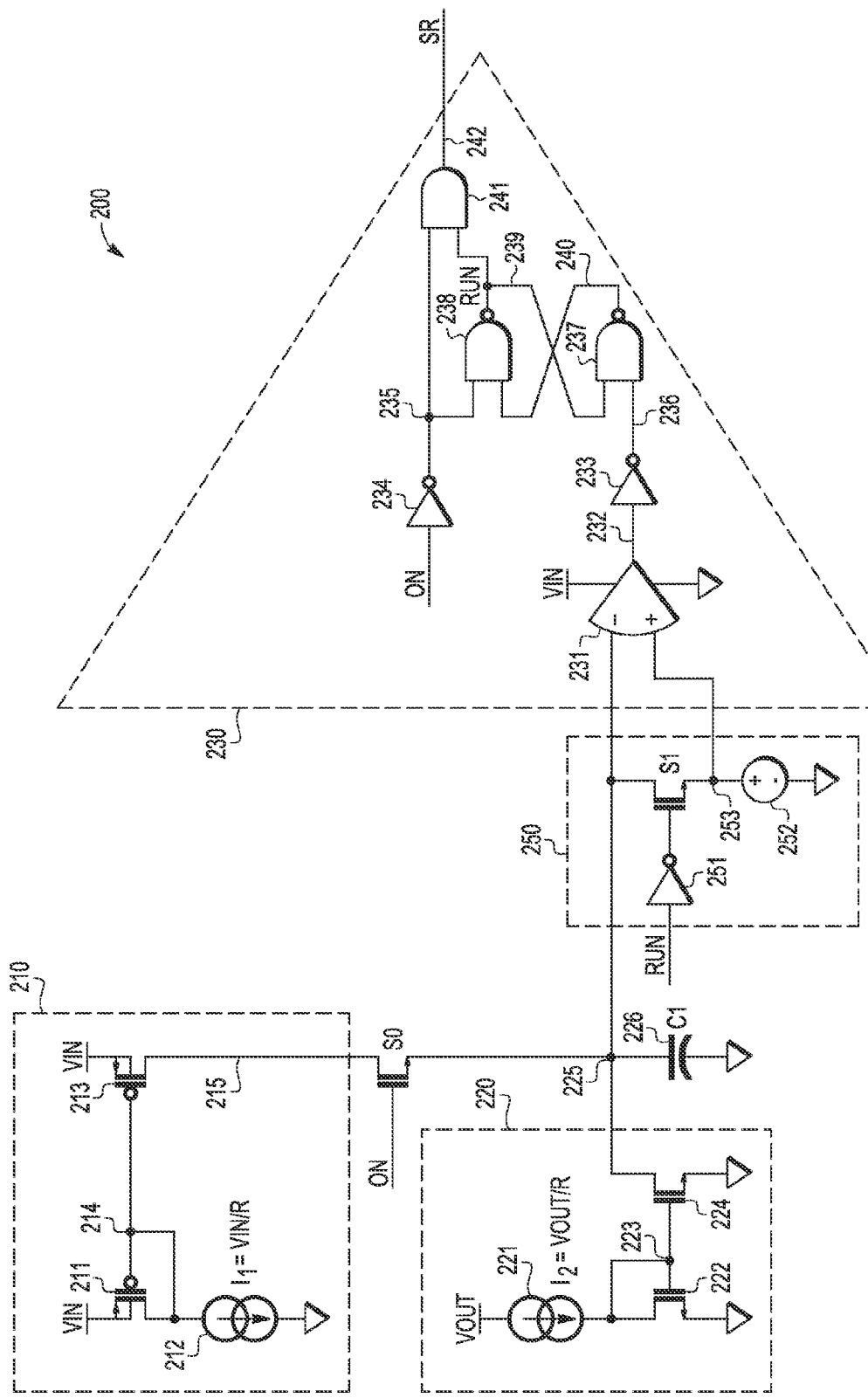
FIG. 2 is a simplified circuit schematic of a synchronous rectifier control timer for a discontinuous mode DC/DC converter in accordance with selected first embodiments.

To accurately and efficiently control the duration of the off-time portion of the switching cycle, there is disclosed in FIG. 2 a synchronous rectifier control timer circuit 200 for a discontinuous mode DC/DC converter in accordance with selected first embodiments. Generally speaking, the control timer circuit 200 includes first and second current sources 210, 220 which are coupled to charge and discharge a C1 integrating capacitor 226 with a current and generate a voltage level that is provided to a comparison circuit 230 which detects when the capacitor voltage returns to an initial reference input voltage, and generates therefrom the second control signal SR. By choosing the current sources 210, 220 to be proportional to the values of VIN and VOUT, respectively, the voltage on the C1 integrator capacitor 226 rises and falls in proportion to the inductor current on the L1 inductor 114.

In an example embodiment, the first current source 210 may be implemented with a current mirror configuration. For example, first and second PMOS transistors 211, 213 are shown as being connected back-to-back to a common gate terminal 214. The first PMOS transistor 211 may be source-drain connected between the input voltage VIN and a current source 212 for providing a first current value (e.g., VIN/R), where the gate and source of the PMOS transistor 211 are connected to the common gate terminal 214. The second PMOS transistor 213 is source-drain connected between the input voltage VIN and a current output terminal 215 and gated by the common gate terminal 214. With this configuration, the current source 210 generates a first charging current $I_1$ that is approximately proportional to the input voltage VIN (e.g., $I_1$=VIN/R) whenever the first control signal ON turns "ON" the first NMOS switching device S0, thereby charging the charging node 225 and the C1 capacitor 226 connected thereto.

In similar fashion, the second current source 220 may be implemented with a current mirror configuration wherein first and second NMOS transistors 222, 224 are connected back-to-back to a common gate terminal 223. The first NMOS transistor 222 may be source-drain connected between a power supply voltage (e.g., ground) and a current source 221 which is connected to the output voltage VOUT to provide a second current value (e.g., VOUT/R), where the gate and source of the NMOS transistor 222 are connected to the common gate terminal 223. The second NMOS transistor 224 is source-drain connected between the ground supply voltage and the charging node 225 and gated by the common gate terminal 223. With this configuration, current source 220 generates a second discharging current $I_2$ that is proportional to the output voltage VOUT (e.g., $I_2$=VOUT/R).

Whenever the first control signal turns "ON" the first NMOS switching device S0, the charging node 255 is simultaneously charged with a current from current source 210 with a current proportional to VIN/R and discharged by current source 220 with a current proportional to VOUT/R. Thus the net current is equal to the difference in these currents, namely (VIN−VOUT)/R.

The synchronous rectifier control timer circuit 200 may also include an initialization circuit 250 for initializing the integrating capacitor C0 at node 225 to a convenient initial or start voltage value. While a variety of different initialization circuits may be used, FIG. 2 shows that the initialization circuit 250 includes a switching transistor S1 (e.g., NMOS transistor) which is drain-source connected between the charging node 225 and a first voltage source 252 for providing an initial reference input voltage (e.g., 500 mV) at node 225. Whenever the switching transistor S1 is turned "ON" (e.g., by a received RUN signal that is inverted by inverter circuit 215 before being applied to the gate of the switching transistor S1), the charging node 225 is connected to the initial reference input voltage. Otherwise, when the NMOS switching transistor S1 is turned "OFF," the charging node 225 is able to be charged and discharged. In this way, the initialization circuit 250 is turned "ON" when the RUN signal is low to hold or initialize the C1 capacitor 226 at the initial reference input voltage, and is turned "OFF" when the RUN signal is high, allowing the voltage on the C1 capacitor 226 to rise and fall analogously to the current in the L1 inductor 114.

In the comparison circuit 230, the inputs—from the first voltage source 252 and the capacitor voltage on the charging node 225—are compared to detect when the capacitor C1 discharges back to the initial reference input voltage. When this occurs, the comparison circuit 230 drives the second control signal SR at output terminal 242 "low" to turn "OFF" the synchronous rectifier transistor M1. While a variety of different SR control signal generation circuits may be used, FIG. 2 shows that the comparison inputs 253, 225 are provided to a comparator 231 which compares the inputs and switches its output 232 to indicate which is larger. During initialization when the charging node 225 is coupled across switching transistor S1 to the first voltage source 252, the comparator 231 outputs a "HIGH" signal at output 232. However, for so long as the node 225 is at a voltage that is larger than the input reference voltage at node 253, the comparator 231 outputs a "LOW" signal at output 232 to indicate that the voltage at node 225 is higher than the input reference voltage at input node 253. Once the integration capacitor voltage at charging node 225 returns to the input reference voltage or lower, the comparator 231 outputs a "HIGH" signal at output 232.

The comparator output 232 and first control signal ON may then be logically combined to generate the second control signal SR at output terminal 242 to turn "ON" when the first control signal ON goes "LOW" and to turn "OFF" when the integration capacitor voltage at charging node 225 is discharged to the input reference voltage. In an example embodiment, the comparator output signal 232 and first control signal ON are logically combined by first inverting the signals with inverters 234, 233, respectively, and then applying the resulting inverted signals 235, 236 to a NAND gate set-reset (SR) flip-flop device. A relatively straightforward way to make single-bit SR flip-flop is to connect together a pair of cross-coupled two-input NAND gates to form an active LOW SR NAND gate latch with feedback from each NAND gate output to one of the other NAND gate inputs. In FIG. 2, the SR flip-flop includes cross-coupled NAND gates 237, 238, where the first NAND gate 238 receives the inverted first control signal 235 as the Set input, and where the second NAND gate 237 receives the inverted comparator output signal 236 as the Reset input. The output 239 from the first NAND gate 238 is the RUN signal that provides an output to a two-input AND gate 241 which also receives the inverted first control signal 235 as an input.

With these inputs 235, 239, the AND gate 241 generates the second control signal SR to turn "ON" when the first control signal ON goes "LOW" and to turn "OFF" when the integration capacitor voltage at charging node 225 is discharged to the input reference voltage.

By appropriately designing the first and second current sources 210, 220 to be proportional to the VIN and VOUT voltages, respectively, the rate of voltage change (e.g., slope) of the capacitor voltage at the C1 capacitor 226 as it charges and discharges is proportional to the rate of current change or slope at the L1 inductor 114 in the DC/DC converter. In particular, the slope of the inductor current at the L1 inductor 114 when being charged or ramped up (when the first control signal ON is "HIGH") is proportional to the difference between the input and output voltages (VIN−VOUT). Likewise, the slope of the capacitor voltage at the C1 capacitor 226 when being charged or ramped up (when the first control signal ON is "HIGH") is proportional to the difference between the input and output voltages (VIN−VOUT). In similar fashion, the discharge rate or slope of the integration capacitor voltage and the inductor current when being ramped down (e.g., when the first control signal ON is "LOW" and the second control signal SR is "HIGH") is proportional to the output voltage (VOUT). In this way, when the first control signal is ON and the inductor current is increasing, the slope of the inductor current and the slope of the capacitor voltage are both proportional to VIN-VOUT since the slope of the capacitor voltage depends on the current sources 210 and 220 whose total value is proportional to VIN-VOUT. Conversely, when the first control signal is OFF and the inductor current is decreasing towards zero, the slope of the inductor current and the slope of the capacitor voltage are both proportional to VOUT since the slope of the capacitor voltage depends on only the current source 220. With this relationship, there is no need to directly measure the inductor current since the comparison circuit 230 provides an indication of when the inductor current is zero by detecting when the capacitor voltage returns to the initial reference voltage value.

Figure 3:
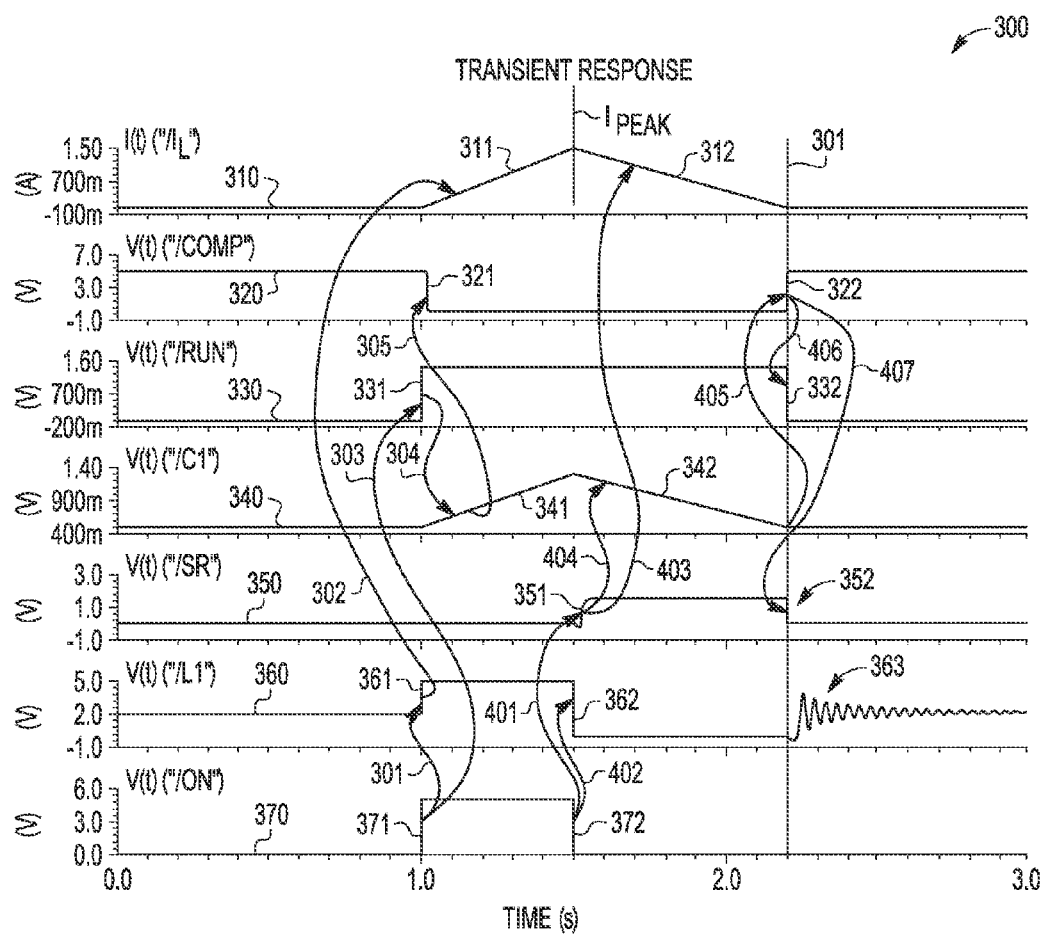
FIG. 3 depicts in graph form a set of circuit simulation waveforms to illustrate operation of the discontinuous mode DC/DC converter under control of the synchronous rectifier control timer shown in FIG. 2.

To further illustrated selected embodiments of the present invention, reference is now made to FIG. 3 which depicts in graph form a set of circuit simulation waveforms 300 to illustrate operation of the discontinuous mode DC/DC converter under control of the synchronous rectifier control timer 200 shown in FIG. 2. In this example, the input voltage VIN=5V, the output voltage VOUT=2V, the first supply voltage VDD provided to the various circuit elements is VDD=1.5V, and the ground supply voltage VSS=0V. However, it will be appreciated by those skilled in the art that the voltage and current values illustrated in FIG. 3 are exemplary and that other values are possible within the context of the invention.

As shown in FIG. 3, first control signal that activates the DC/DC conversion process and the synchronous rectifier is represented as the voltage (ON) signal 370 as a function of time (t). With reference to FIGS. 1-2, the first control signal 370 is applied to activate the first switching transistor M0 (to begin charging the inductor L1) and the first switching device S0 (to connect the first current source 210 to the capacitor 226), and as an input to the comparison circuit 230 at inverter 234. Transitioning between 0V and 5V, the first control signal 370 includes a first "HIGH" transition 371 and second "LOW" transition 372 which define a positive on-time charging pulse having a suitable duration. These transitions 371, 372 initiate the charging of the inductor and capacitors, and also control the generation of the second control signal (SR) as described hereinbelow. Before the on-time charging pulse, no current flows in the L1 inductor, and the inductor voltage at node 113 is at 2 V (VOUT). The capacitor C1 is held at an arbitrary value (500 mV) until the ON signal occurs.

In response to the "HIGH" transition 371 in the first control signal 370 at 1 μs, the inductor in the DC/DC converter begins charging for the on-time duration, as indicated at 302. The resulting voltage at the junction of the switches and inductor is represented as the voltage (L1) signal 360 as a function of time (t), and is the voltage that appears at the internal junction node 113 of the DC/DC converter. Beginning with an initial voltage (e.g., 2V), the voltage signal 360 includes a first "HIGH" transition 361 (from 2V to 5V) and second "LOW" transition 362 (from 5 V to approximately zero) which define a positive on-time inductor charging pulse having a duration that is controlled by the pulse width of the first control signal 370. With the first "HIGH" transition 361, the junction (113) voltage is pulled to the input voltage VIN by the switching transistor M0, and the inductor voltage remains at the input voltage level for the duration of the charging time ($T_{ON}$). After the on-time inductor charging pulse, the inductor voltage is held to approximately zero volts by the synchronous rectifier transistor M1 until released by the second control signal (SR), at which time the voltage 363 rings with some parasitic capacitance while returning to the initial voltage.

In response to the "HIGH" junction voltage 360, the current in the inductor in the DC/DC converter begins ramping up 311 for the on-time duration, as indicated at 302. The resulting inductor current is represented as the current ($I_L$) signal 310 as a function of time (t), and is the current in the L1 inductor 114 of the DC/DC converter. Beginning with an initial inductor current (e.g., 0 mA), the inductor current signal 310 begins ramping up with ramp up slope 311. As disclosed herein, the slope of the inductor current charging ramp 311 is proportional to the difference between the input and output voltages (VIN−VOUT). As shown with waveform 310, the inductor current continues to charge during the inductor charging time ($T_{ON}$), reaching a peak current value $I_{PEAK}=((VIN-VOUT) \times T_{ON})/L1$.

The "HIGH" transition 371 in the first control signal 370 also causes the "run" waveform 330 to go "HIGH" as indicated at 303. The resulting "run" waveform voltage is represented as the voltage (run) signal 330 as a function of time (t), and is the voltage that is applied as a control signal for the initialization circuit 250 of the timer control circuit 200. Transitioning between 0V and 1.5 V, the "run" waveform signal 330 includes a first "HIGH" transition 331 and second "LOW" transition 332 which define a window during which the capacitor C1 is released and the voltage on the capacitor C1 is free to rise and fall. For so long as the initiation or "run" waveform 330 is "HIGH" and inverted by inverter 251 to gate the switching transistor S1, the voltage at the C1 capacitor 226 is released from the voltage source 252, and can rise and fall, analogously to the current in the L1 inductor 114. Conversely, when the "run" waveform 330 returns to "LOW" as indicated by transition 332, the switching transistor S1 is turned "ON" to short or connect the capacitor C1 to the initial voltage value provided by the first voltage source 252.

While the "run" waveform 330 and the first control signal 370 are both "HIGH," the capacitor 226 in the timer control circuit 200 is charged as indicated at 304. The resulting voltage at the capacitor is represented as the "C1" voltage signal 340 as a function of time (f), and is the voltage measured at the charging node 225 of the timer control circuit 200. Beginning with an initial offset voltage (e.g., 500 mV), the capacitor voltage signal 340 begins ramping up for the on-time duration 341. As disclosed herein, the slope of the ramp up voltage during interval 341 is proportional to the difference between the input and output voltages (VIN−VOUT), and the capacitor voltage continues to increase during the inductor charging time ($T_{ON}$), reaching a peak voltage value $V_{PEAK}=(VIN-VOUT)/(R \times C1)$, where R is the value of the resistance that may be used in current sources 212 and 221 to generate currents proportional to VIN and VOUT respectively.

As seen from the foregoing, the on-time charging pulse of the first control signal 370 is used to simultaneously increase the L1 inductor current in the DC/DC converter and the C1 capacitor voltage in the timer control circuit 200 at a rate that is proportional to VIN−VOUT. And at the conclusion of the on-time charging pulse shown at the "LOW" transition 372, the L1 inductor current and the C1 capacitor voltage both begin to decrease by disconnecting the input voltage VIN and simultaneously providing a discharge path. In particular and as indicated at 401, the "LOW" transition 372 in the first control signal (at 1.5 μs) causes the synchronous rectifier (SR) waveform 350 to go "HIGH" as indicated at 351. The resulting "SR" waveform voltage is represented as the voltage signal 350 as a function of time (t). In FIGS. 1-2, the SR waveform is the voltage that is generated by the comparison circuit 230 of the timer control circuit 200 and applied as the second control signal SR to the synchronous rectifier transistor M1 of the DC/DC converter. Transitioning between 0V and 1.5 V, the "SR" waveform signal 350 includes a first "HIGH" transition 351 and second "LOW" transition 352 which define an off-time discharging duration during which the L1 inductor and capacitor C1 are discharged. The "SR" waveform signal 350 is the synchronous rectifier drive signal applied to the synchronous rectifier transistor M1 of the DC/DC converter.

In the DC/DC converter 100, the first control signal and second control signal are applied to disconnect the input voltage VIN from the internal junction node 113 (by turning off the first switching transistor M0) and to drive the internal junction node 113 toward ground (by turning on the synchronous rectifier transistor M1). This is indicated at 402 where the first control signal "LOW" transition 372 and SR control signal "HIGH" transition 351 combine to drive LOW the inductor voltage waveform 360. And as indicated at 403, the activated synchronous rectifier transistor M1 allows the L1 inductor to begin decreasing, resulting in the inductor current decrease ramp 312 having a slope that is proportional to the output voltage VOUT. Given the peak inductor current value $I_{PEAK}$ that is reached after charging for $T_{ON}$, the inductor discharge time $T_{L1-OFF}=I_{PEAK}-L1/VOUT=((VIN-VOUT) \times T_{ON})/VOUT$.

At the same time, the first control signal 370 is applied in the timer control circuit 200 to disconnect the current source 210 (by turning off the switching device S0) so that the integrating node 225 is discharged toward ground by the second current source 220. As indicated at 404, the C1 capacitor discharges through the second current source 220, resulting in the discharge voltage ramp 342 having a discharge rate that is proportional to the output voltage VOUT. Given the peak capacitor voltage value $V_{PEAK}$ that is reached after charging for $T_{ON}$, the capacitor discharge time $T_{C1-OFF}=V_{PEAK} \times C1 \times R/VOUT=((VIN-VOUT) \times T_{ON})/VOUT$, where R is the value of the resistance that may be used in current sources 212 and 221 to generate currents proportional to VIN and VOUT respectively.

As seen from the foregoing, the discharge times $T_{L1-OFF}$, $T_{C1-OFF}$ for the L1 inductor and C1 capacitor are equal to one another, meaning that the time required to discharge the C1 capacitor to its initial voltage corresponds to the time required to reduce the inductor current to zero. To exploit this relationship, the timer control circuit 200 monitors the C1 capacitor voltage relative to the initial reference input voltage to determine when the C1 capacitor voltage returns to the initial reference input voltage, indicating the capacitor discharge time $T_{C1\text{-}OFF}$, and by inference, the inductor discharge time $T_{L1\text{-}OFF}$.

To this end, the timer control circuit 200 provides an internal comparison signal 320 which is represented as the voltage (comp) signal 320 as a function of time (t). In FIG. 2, the comparison signal is generated at node 232 by the comparator 231 in response to comparator inputs 253, 225. Transitioning between 5V and 0V, the "comp" waveform signal 320 includes a first "LOW" transition 321 and second "HIGH" transition 322 during which the integration capacitor voltage is greater than the initial reference input voltage. For so long as the voltage at the C1 capacitor is larger than the initial reference input voltage (e.g., when the ramp voltages 341, 342 are greater than the initial reference input voltage), the "comp" waveform signal 320 is "LOW." Thus, the "HIGH" transition 322 provides a "zero crossing" indication that the integration capacitor voltage has returned to the initial reference input voltage.

To the extent that the charge and discharge rates for the inductor current and integration capacitor voltage track one another, the "zero crossing" indication 322 for the integration capacitor voltage also indicates that the inductor current has also returned to zero. As a result, the "zero crossing" indication 322 may be used to turn off the "run" waveform signal 330 (as indicated at 406) and the synchronous rectifier (SR) control signal 350 (as indicated at 407). In the timer control circuit 200 shown in FIG. 2, the "zero crossing" indication 322 may be generated by the comparator 231 and logically combined with the first control signal 370 using one or more logic gates to generate the "LOW" transition 352 in the synchronous rectifier (SR) waveform 350 at output node 242.

As seen from the foregoing, the purpose of the timer control circuit. 200 is to generate the SR signal 350 with transitions 351, 352 at the appropriate time to prevent reverse current at the L1 inductor. In particular, the SR signal 350 transitions "HIGH" 351 when the first control signal ON 370 goes "LOW" at transition 352 and stays "LOW" until the inductor current 310 returns to zero. To control the timing of the "LOW" transition 352, the timer control circuit 200 detects when the C1 capacitor voltage has reached its initial reference input voltage (which may be arbitrarily set). Because the charging and discharging of the C1 capacitor is done analogously to the current in the L1 inductor, the point when the C1 capacitor voltage reaches the initial reference input voltage occurs at the same time the L1 inductor current reaches zero.

Figure 4:
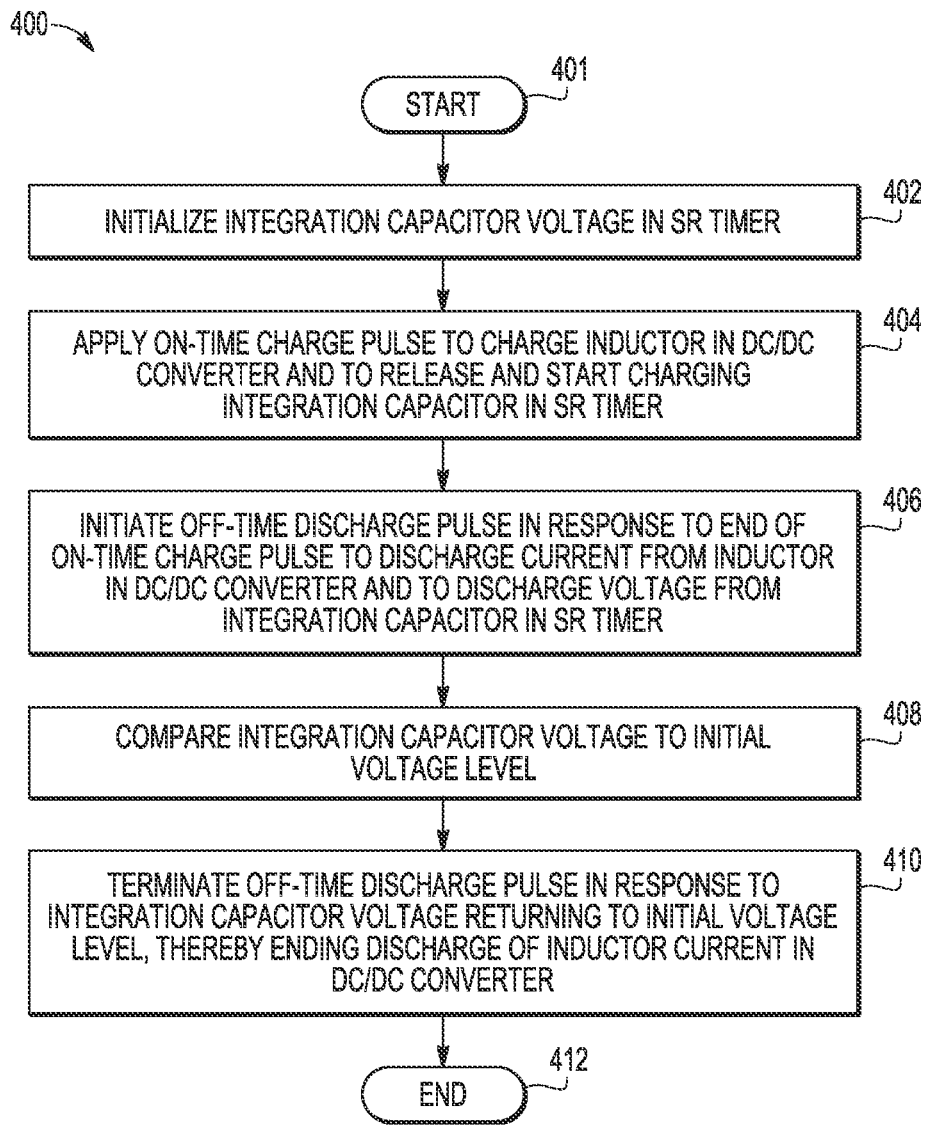
FIG. 4 is a flow chart illustration of various methods for generating a synchronous rectifier control signal in accordance with selected embodiments of the invention.

To further illustrated selected embodiments of the present invention, reference is now made to FIG. 4 which is a flow chart illustration of various methods for generating a synchronous rectifier control signal in accordance with selected embodiments of the invention. In describing the methodology 400, the description is intended merely to facilitate understanding of various exemplary embodiments and not by way of limitation. Unless otherwise indicated, subsequent steps may be provided in any desired order.

Once the method starts (step 401), an integration capacitor in the synchronous rectifier timer is initialized to an initial voltage level (e.g., 500 mV) at step 402. In selected embodiments, the integration capacitor is directly or indirectly connected to a reference voltage source, thereby charging the capacitor to the initial voltage level.

At step 404, an on-time charging pulse is applied to charge the inductor in the DC/DC converter, and to simultaneously release and start charging the integration capacitor in the SR timer. In selected embodiments, the on-time charging pulse is generated at the first control signal ON. Before the on-time charging pulse is generated, no current flows in the inductor. Once generated, the on-time charging pulse is applied to turn ON the inductor charging transistor (e.g., M0) in the DC/DC converter, thereby building up current in the inductor at a rate that is proportional to VIN−VOUT. In addition, the on-time charging pulse in the first control signal ON may also be applied to the initialization circuit to release the integration capacitor from the reference voltage source, and to connect a first current source to the integration capacitor, where the first current source provides a current that is proportional to the input voltage VIN. In combination with the discharge action provided by a second current source that provides a discharge current that is proportional to the output voltage VOUT, the capacitor charges at a rate that is proportional to VIN-VOUT during the on-time charging pulse.

At step 406, an off-time discharge pulse is initiated in response to the end of the on-time charging pulse, and then applied to discharge the inductor in the DC/DC converter. In selected embodiments, the off-time discharge pulse is generated at the second control signal SR. With the on-time charge pulse ended, the capacitor is no longer being charged by the first current source, and is instead discharged by the discharge action of the second current source in the SR timer. As a result, the capacitor begins to discharge at a rate proportional to the output voltage VOUT.

At step 408, the integration capacitor voltage is compared to the initial voltage level to determine when the integration capacitor voltage discharges back to the initial level. In selected embodiments, the comparison may be implemented with a comparison circuit which compares the integration capacitor voltage to the initial voltage level provided by the reference voltage source.

At step 410, the off-time discharge pulse is terminated or ended upon detecting that to the integration capacitor voltage has discharged back to the initial level. In selected embodiments, the indication that the integration capacitor voltage has returned to the initial voltage level is generated when the comparison or op amp circuit generates a predetermined signal transition (e.g., a "HIGH" transition) which in turn may be used to drive LOW the second control signal SR. Insofar as the charge and discharge rates for the integration capacitor voltage are proportional to the charge and discharge rates for the inductor current, the off-time discharge pulse duration for the integration capacitor provides a good measure of the current discharge time required for the inductor, and therefore may be used to generate a suitable cut-off for the second control signal SR so that reverse current events are avoided. At step 412, the method ends.

With the synchronous rectifier timer circuits disclosed herein, the integrator uses a capacitor having a voltage that rises and fails in proportion to the inductor current, so there is no need to directly measure the inductor current since the integration capacitor provides an indication of when the inductor current is zero by monitoring the when the capacitor voltage returns to the initial voltage level. In other words, the voltage across the capacitor provides an analogous charge/discharge measure for the inductor current which is easier to use in detecting "zero crossing" events. In contrast to conventional solutions for controlling the synchronous rectifier, the synchronous rectifier timer circuits disclosed herein provide instantaneous response time with low quiescent current consumption and reduced complexity. In addition, the disclosed synchronous rectifier timer circuits are insensitive to component variations, in particular capacitors, inductors or comparator offsets.

By now it should be appreciated that there is provided herein a DC-DC converter and associated method of operation for generating an output voltage VOUT from an input voltage VIN. The converter includes a switching circuit that is source-drain connected between an input power terminal (VIN) and a first terminal or junction node of an inductor that is connected to an output power terminal (VOUT), where the switching circuit is turned on by a first control signal. The converter also includes a synchronous rectification switching circuit that is connected between the junction node and a reference voltage or supply, where the synchronous rectification switching circuit is turned on by a synchronous rectifier control signal. Finally, the converter includes a synchronous rectifier control circuit with a capacitor having a voltage that is charged and discharged by first and second current sources to track inductor current changes (e.g., increases and decreases), thereby generating the synchronous rectifier control signal that is applied to the synchronous rectification switching circuit to turn off the synchronous rectification switching circuit when the inductor current is effectively zero, where the term "effectively zero" refers to inductor current that is zero or substantially or approximately zero. The switching circuits may be implemented with a transistor, such as a MOSFET, bipolar, IGBT, NMOS, PMOS, NPN, PNP, etc. In particular, the first and second current sources charge the capacitor at a rate that is proportional to the difference between the input voltage VIN and the output voltage VOUT during each charge pulse in the first control signal, and the second current source discharges the capacitor to a ramp down voltage at a rate that is proportional to an output voltage VOUT. To determine the duration of the capacitor/inductor discharge, the synchronous rectifier control circuit includes a comparison circuit with inputs coupled to the capacitor and a reference voltage, where the comparison circuit includes circuitry for providing a first signal indication when the capacitor voltage is larger than the reference voltage, and for providing a second signal indication when the capacitor voltage is not larger than the reference voltage. The synchronous rectifier control circuit may also include an initialization circuit for precharging the capacitor to a predetermined voltage prior before the inductor current starts rising.

In another form, there is provided a synchronous rectifier (SR) circuit and associate method of operation. In the SR circuit, an integration capacitor is connected between a charging node and a reference voltage. In addition, a first current source is connected to the charging node under control of a first switching transistor to charge the integration capacitor during each charge pulse in a first control signal, and a second current source is connected to the charging node to discharge charge the integration capacitor. In selected embodiments, the first current source charges the integration capacitor with a current that is proportional to an input voltage VIN during each charge pulse in the first control signal, and the second current source discharges the voltage of the integration capacitor with a current that is proportional to an output voltage VOUT. The SR circuit also includes a comparison circuit with a first input coupled to the charging node, a second input coupled to receive a first voltage, and a comparison output. The comparison circuit includes circuitry for providing a first signal indication when a capacitor voltage at the charging node is larger than the first voltage, and for providing a second signal indication when an integration capacitor voltage at the charging node is not larger than the first voltage. At the comparison output, a logic circuit is coupled with circuitry for generating a synchronous rectifier pulse at a first logic circuit output in response to the charge pulse in the first control signal and the second signal indication from the comparison circuit. The first logic circuit output is coupled to the gate of a first transistor for receiving the synchronous rectifier pulse, where the transistor's source is coupled to the reference voltage, and the transistor's drain is coupled to an inductor in a discontinuous mode DC/DC converter so that the first transistor discharges the inductor during the synchronous rectifier pulse. In selected embodiments, the comparison circuit includes a comparator with a first input coupled to the charging node, a second input coupled to receive the first voltage, and a comparison output for providing the second signal indication when the integration capacitor voltage at the charging node is not larger than the first voltage. In these embodiments, the logic circuit may be implemented with first and second inverters coupled to an SR flip-flop circuit and an AND gate circuit. The first and second inverters receive and invert the first control signal and the comparison output, respectively, and generate therefrom an inverted first control signal and an inverted comparison output. In addition, the SR flip-flop circuit is connected to receive the inverted first control signal and the inverted comparison output as inputs, and includes circuitry for generating a first flop-flop output. Finally, the AND gate circuit includes first and second inputs coupled to receive the inverted first control signal and the first flip-flop output, respectively, thereby generating the synchronous rectifier pulse. The SR circuit may also include an initialization circuit for precharging the integration capacitor to a predetermined voltage, where the initialization circuit includes an equalizing or precharging transistor for connecting the charging node to an initialization voltage under control of a first control signal to charge the integration capacitor to the initialization voltage. In selected embodiments, the initialization voltage is the first voltage.

In yet another form, there is provided a method and apparatus for generating an output DC voltage VOUT from an input DC voltage VIN. In the disclosed methodology, an input power terminal is connected to a first junction node at an inductor with a first switching transistor that is gated by a first control signal, thereby charging the inductor with a first inductor current during an ON time of the first control signal and discharging the inductor with a second inductor current during an OFF time of the first control signal. In addition, the junction node is connected to a ground supply with a second switching transistor that is gated by a synchronous rectifier control signal. The synchronous rectifier control signal is generated by charging and discharging a voltage at an integration capacitor with first and second current sources to track the first and second inductor current at the inductor so that the second switching transistor is turned off when the inductor current is approximately zero. In selected embodiments, the first and second current sources charge the integration capacitor to a ramp up voltage at a rate that is proportional to a difference between the input voltage VIN and the output voltage VOUT during each charge pulse in the first control signal. In addition, the second current source discharges the integration capacitor to a ramp down voltage at a rate that is proportional to an output voltage VOUT. To generate the synchronous rectifier control signal, a capacitor voltage at the integration capacitor is compared to a reference voltage by a comparator circuit which generates a first signal level for the synchronous rectifier control signal when the capacitor voltage is larger than the reference voltage, and a second signal level for the synchronous rectifier control signal when the capacitor voltage is not larger than the reference voltage. As disclosed, the input power terminal may be connected to the first junction node of the inductor by applying an on-time charge pulse to the first switching transistor to charge the inductor, where the on-time charge pulse is simultaneously applied to a switching device to start charging the integration capacitor with the first current source. In addition, an off-time discharge pulse may be initiated upon conclusion of the on-time charge pulse to discharge current from the inductor through the second switching transistor and to discharge voltage from the integration capacitor. In other embodiments, the integration capacitor is precharged to a predetermined voltage before connecting the first and second current sources to the integration capacitor.

Although the described exemplary embodiments disclosed herein are directed to synchronous rectifier timer control circuits and methods for operating same, the present invention is not necessarily limited to the example embodiments which illustrate inventive aspects of the present invention that are applicable to a wide variety of circuit designs and operations. Thus, the particular embodiments disclosed above are illustrative only and should not be taken as limitations upon the present invention, as the invention may be modified and practiced in different but equivalent manners apparent to those skilled in the art having the benefit of the teachings herein. For example, although selected circuit implementations and associated waveform simulations are described with reference to FIGS. 1-4, it will be appreciated by those of ordinary skill in the art that the same concepts and methods can be implemented other circuit arrangements for using an integration capacitor to generate a voltage that is proportional to inductor current with the zero crossing time being used to turn off synchronous rectifier in the DC/DC converter. Accordingly, the identification of the specific circuit configurations provided herein is merely by way of illustration and not limitation and other circuit arrangements may be used in order to form the synchronous rectifier timer controller. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A DC-DC converter to generate an output voltage VOUT from an input voltage VIN, comprising:
   a switching circuit connected between an input power terminal and a junction node to an inductor that is connected to an output power terminal, where the switching circuit is turned on by a first control signal to charge the inductor;
   a synchronous rectification switching circuit connected between the junction node and a reference voltage, where the synchronous rectification switching circuit is gated by a synchronous rectifier control signal; and
   a synchronous rectifier control circuit comprising a capacitor having a voltage that is charged and discharged by first and second current sources to reflect inductor current changes, thereby generating the synchronous rectifier control signal that is applied to turn off the synchronous rectification switching circuit when the inductor current is effectively zero;
   where the synchronous rectifier control circuit comprises a comparison circuit comprising a first input coupled to the capacitor, a second input coupled to receive a reference voltage, and a comparison output, where the comparison circuit comprises circuitry for providing a first signal indication when the capacitor voltage is larger than the reference voltage, and for providing a second signal indication when the capacitor voltage is not larger than the reference voltage;
   wherein the synchronous rectifier control circuit comprises a latch circuit that changes state to a first state in response to the comparison circuit providing the second signal indication, wherein the synchronous rectifier control circuit turns off the synchronous rectification switching circuit in response to the latch circuit changing state to the first state.

2. The DC-DC converter of claim 1, where the first and second current sources charge the capacitor at a rate that is proportional to a difference between the input voltage VIN and the output voltage VOUT during each charge pulse in the first control signal.

3. The DC-DC converter of claim 1, where the second current source discharges the capacitor at a rate that is proportional to an output voltage VOUT.

4. The DC-DC converter of claim 1 wherein the latch circuit is characterized as an SR flip flop.

5. The DC-DC converter of claim 1, further comprising an initialization circuit for precharging the capacitor to a predetermined voltage before charging the inductor.

6. A synchronous rectifier circuit comprising:
   (a) an integration capacitor connected between a charging node and a reference voltage;
   (b) a first current source connected to the charging node under control of a first switching transistor to charge the integration capacitor during each charge pulse in a first control signal;
   (c) a second current source connected to the charging node to discharge the integration capacitor;
   (d) a comparison circuit comprising a first input coupled to the charging node, a second input coupled to receive a first voltage, and a comparison output, where the comparison circuit comprises circuitry for providing a first signal indication when a capacitor voltage at the charging node is larger than the first voltage, and for providing a second signal indication when the capacitor voltage at the charging node is not larger than the first voltage;
   (e) a logic circuit comprising a first logic circuit input coupled to the comparison output, where the logic circuit comprises circuitry for generating a synchronous rectifier pulse at a first logic circuit output in response to the charge pulse in the first control signal and the second signal indication from the comparison circuit; and (f) a first transistor having a gate coupled to receive the synchronous rectifier pulse from the first logic circuit output, a source coupled to the reference voltage, and a drain coupled to an inductor in a DC/DC converter so that the first transistor completely discharges the inductor during the synchronous rectifier pulse;

where the comparison circuit comprises a comparator comprising the first input coupled to the charging node, the second input coupled to receive the first voltage, and the comparison output for providing the second signal indication when the capacitor voltage at the charging node is not larger than the first voltage;

wherein the logic circuit includes a latch circuit, the latch circuit changes state in response to the comparison output providing the second signal indication.

7. The synchronous rectifier circuit of claim 6, where the first current source charges the integration capacitor with a current that is proportional to an input voltage VIN input to the DC/DC converter during each charge pulse in the first control signal.

8. The synchronous rectifier circuit of claim 6, where the second current source discharges the voltage of the integration capacitor with a current that is proportional to an output voltage VOUT input to the DC/DC converter.

9. The synchronous rectifier circuit of claim 6, where the latch circuit is characterized as an SR flip-flop, where the logic circuit comprises:

a first inverter comprising an input coupled to receive the first control signal and an inverter output for generating an inverted first control signal;

a second inverter comprising an input coupled to the comparison output and an inverter output for generating an inverted comparison output;

the SR flip-flop circuit comprising first and second inputs coupled to receive the inverted first control signal and the inverted comparison output, respectively, where the SR flip-flop circuit comprises circuitry for generating a first flop-flop output; and an AND gate circuit comprising first and second inputs coupled to receive the inverted first control signal and the first flip-flop output, respectively, thereby generating the synchronous rectifier pulse.

10. The synchronous rectifier circuit of claim 6, further comprising an initialization circuit for precharging the integration capacitor to a predetermined voltage.

11. The synchronous rectifier circuit of claim 10, where the initialization circuit comprises an equalizing transistor for connecting the charging node to an initialization voltage under control of a first control signal to charge the integration capacitor to the initialization voltage.

12. The synchronous rectifier circuit of claim 11, where the initialization voltage is the first voltage.

13. A method for generating an output DC voltage VOUT from an input DC voltage VIN, comprising:

connecting an input power terminal to a first junction node at an inductor with a first switching transistor that is gated by a first control signal to charge the inductor at a first rate during an ON time of the first control signal;

disconnecting the input power terminal from the first junction node at the inductor with the first switching transistor that is turned off by the first control signal during an OFF time of the first control signal; and connecting the junction node to a first reference voltage with a second switching transistor that is gated by a synchronous rectifier control signal to discharge the inductor at a second rate during an OFF time of the first control signal, where the synchronous rectifier control signal is generated by charging and discharging an integration capacitor with first and second current sources to reflect the inductor current so that the second switching transistor is turned off when the inductor current is effectively zero;

further comprising generating the synchronous rectifier control signal by comparing a capacitor voltage at the integration capacitor to a second reference voltage to generate a first signal level for the synchronous rectifier control signal when the capacitor voltage is larger than the second reference voltage, and to generate a second signal level for the synchronous rectifier control signal when the capacitor voltage is not larger than the second reference voltage;

changing a latch state of a latch circuit in response to a determination that the capacitor voltage is not larger than the second reference voltage, wherein the synchronous rectifier control signal changes from the first signal level to the second signal level in response to the changing the latch state.

14. The method of claim 13, where the first and second current sources charge the integration capacitor at a rate that is proportional to a difference between the input voltage VIN and the output voltage VOUT during each charge pulse in the first control signal.

15. The method of claim 13, where the second current source discharges the integration capacitor to at a rate that is proportional to an output voltage VOUT.

16. The method of claim 13, where connecting the input power terminal to the first junction node comprises applying an on-time charge pulse to the first switching transistor to charge the inductor, where the on-time charge pulse is simultaneously applied to a switching device to start charging the integration capacitor with the first current source.

17. The method of claim 16, further comprising initiating an off-time discharge pulse upon conclusion of the on-time charge pulse to discharge current from the inductor through the second switching transistor and to discharge voltage from the integration capacitor.

18. The method of claim 13, further comprising precharging the integration capacitor to a predetermined voltage prior to charging the inductor.

19. The method of claim 13 wherein the latch circuit is characterized as an SR flip flop.

* * * * *